Figure 1:
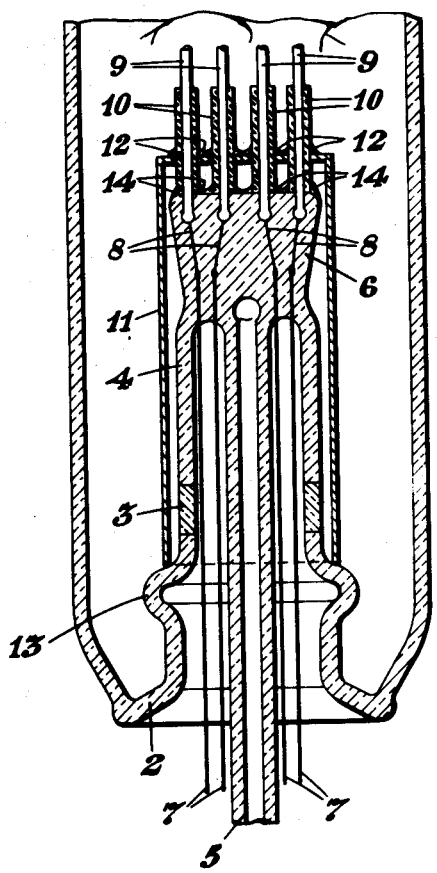

Nov. 12, 1935.   O. FRITZE ET AL   2,020,724
GASEOUS ELECTRIC DISCHARGE LAMP DEVICE
Filed Feb. 5, 1934

INVENTORS
Otto Fritze
Alfred Rüttenauer
BY Harry E. Dunham
ATTORNEY

Patented Nov. 12, 1935

2,020,724

UNITED STATES PATENT OFFICE

2,020,724

GASEOUS ELECTRIC DISCHARGE LAMP DEVICE

Otto Fritze, Berlin, and Alfred Rüttenauer, Berlin-Halensee, Germany, assignors to General Electric Company, a corporation of New York Application February 5, 1934, Serial No. 709,892
In Germany February 22, 1933

4 Claims. (Cl. 176—122)

The present invention relates to gaseous electric discharge lamp devices generally and more particularly the invention relates to such devices having a gaseous atmosphere consisting of, or comprising, a metal vapor.

Electric discharge lamp devices having a gaseous filling consisting of, or comprising a metal vapor, such as cadmium, magnesium, or sodium vapor, require a container consisting, at least in part, of a glass resistant to the chemical effects of such metal vapor. Such resistant glass is frequently unsuitable for sealing the current leads into said container and a glass, such as lead glass, which is non-resistant to the metal vapor in the container but which has better sealing qualities than the resistant glass, is used for sealing purposes in the stem parts of the container. The non-resistant glass stems must be protected from the metal vapor, and a wall of vapor resistant material interposed between the electrodes and the stem and closing off the non-resistant stem parts of the container from the other parts of the container is effective for this purpose. Another manner of protecting the non-resistant glass stems is by precipitating thereon a coating of material resistant to the gaseous atmosphere.

The object of the present invention is to provide in a gaseous electric discharge device having a container the stem parts of which are subject to attack by the vapor in the gaseous filling, a simple, effective and easily mounted means to protect such non-resistant stem parts of the container from the vapor. Further objects and advantages attaching to the device and to its use and operation will be apparent to those skilled in the art from the following particular description.

In accordance with these objects the invention comprises a shield of material resistant to the chemical effects of the vapor in the gaseous filling enclosing the non-resistant glass stems of the container of the lamp device. When the stem part consists of a glass having a different coefficient of expansion than the other glass parts of said container a graded-joint is necessary at the junction point of the stem part and said other parts. As parts of the graded-joint are subject to attack by the vapor the shield also encloses the graded-joint. The shield is made of a material chemically resistant to the gaseous atmosphere. The stem part and the graded joint of the container are thus completely protected from chemical attack by the vapor during the operation of the lamp device by a simple, easily mounted means.

Figure 2:
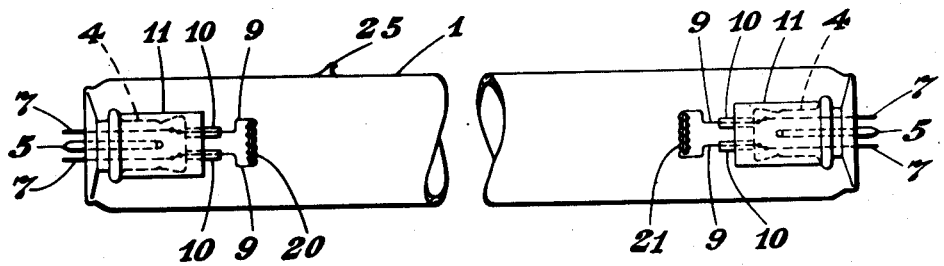

In the drawing accompanying and forming part of this specification an embodiment of the invention is shown, in which Fig. 1 is a sectional view of one end of a gaseous electric discharge lamp device having the new and novel stem protecting structure, and Fig. 2 is a side elevational view of a complete gaseous electric discharge lamp device embodying the present invention.

Like numbers denote like parts in both the figures.

Referring to Figures 1 and 2 of the drawing the gaseous electric discharge lamp device comprises a tubular container 1 having a gaseous atmosphere therein comprising a gas, such as neon, and a vaporizable material, such as sodium. Said container 1 consists of a glass resistant to the chemical effects of the sodium vapor, such as the boro-silicate glass disclosed in co-pending application Serial Number 470,436, filed July 24, 1930, the inventors being Georg Gaidies and Marcello Pirani. A short, flared tube 2 of the same glass as said container 1 is fused to said container 1, as illustrated in Fig. 1 of the drawing. A stem tube 4 consisting of a glass subject to attack by sodium vapor but having better sealing qualities than said resistant glass, such as lead glass, is joined to said tube 2 by the graded-joint 3. The structure of graded-joints for gaseous electric discharge devices is well known in the art and such seals consist of sections of materials fused together; the coefficient of expansion of each section is about intermediate that of the other sections contiguous thereto. A plurality of current leads are sealed into the pinch part 6 of said stem tube 4. Said current leads consist of an external part 7, a part 8 sealed into the pinch part 6 and a part 9 inside said container 1. The interior parts 9 of said current leads support an electrode or electrodes mounted thereon, as shown in Figure 2. The part 9 of each of the leads extending from the pinch part 6 of said stem 4 into the container 1 is surrounded by a close fitting tube 10 of insulating material, such as a tube of magnesium oxide, or aluminium oxide. A shield in the form of a cap 11 of material resistant to the gaseous filling, such as chrom-iron, or a resistant glass, or insulation material, fits over the stem 4 and rests against the circular protuberance 13 in the flared tube 2 making a mechanical joint therewith. The tubes 10 fit snugly into the openings in the cap 11 and a cementing material, indicated at 12, such as a mixture of talc and water glass, is laid around the contiguous parts of said tubes 10 and the cap 11 to insure the closing of the openings in said cap 11. This cementing material is likewise placed around the contiguous parts of the pinch part 6 of the stem 4 and the ends of tubes 10 to seal the joint therebetween, indicated at 14. The metal vapor is thus prevented from penetrating into the interior of cap 11 and from attacking said stem 4 or the step-seal 3. An exhaust tube 5 is fused to said stem 4 and said exhaust tube 5 communicates with the interior of said container 1 through the mechanical joint between said cap 11 and the part 13 of the tube 2, which joint is pervious to gas but impervious to the vapor in said device. The container 1 is exhausted through said tube 5 during the manufacturing of the lamp device.

In Fig. 2 of the drawing we have illustrated a complete gaseous electric lamp discharge device having the stem parts thereof protected by the simple, effective, easily mounted means of the present invention. Said lamp device is of the positive column type and has thermionic electrodes 20 and 21 sealed therein at each end thereof. Said electrodes 20 and 21 consist of a bar of electron emitting material, such as a bar of barium oxide, and a heating element, such as a tungsten wire wrapped around said bar. It will be understood, of course that other types of thermionic electrodes well known in the art are used when desired.

The stem structure illustrated in Fig. 1 has four electrode leads 9 sealed into the stem 4 instead of two leads as illustrated in Fig. 2. This four lead stem structure is desirable when the tubular container has a stem at only one end thereof rather than a stem at each end of the container as in Fig. 2. In the single stem structure of the container two of the electrode leads 9 and the insulation tubes 10 covering said leads 9 extend along the container and terminate adjacent the end of the container opposite that end whereat the stem 4 is mounted. An electrode, or electrodes is mounted on the elongated leads 9 and on the shorter leads 9. This stem structure is also useful in connection with lamp devices having bulb shaped containers and a single stem.

In the above description and in the drawing we have described and illustrated the joint between the circular protuberance 13 and the cap 11 as a mechanical joint and as being pervious to gas but impervious to sodium vapor so that the container 1 can be successfully exhausted through the exhaust tube 5 opening into the interior of cap 11. When it is desired to speed up the exhausting step in the manufacture of the lamp device another exhaust tube, indicated at 25 in Fig. 2, opening directly into the container 1 is provided in addition to the exhaust tube 5. When desired, the cementing material indicated at 12 and 14 is laid around the joint between said cap 11 and the part 13 of tube 2 to make said joint substantially gas tight. In this case, of course, it is necessary to provide an exhaust tube connecting with the interior of container 1 in addition to the exhaust tube 5, as shown at 25 of Fig. 2.

The above described lamp device starts as a gas lamp and operates as a vapor lamp after the heat of the gas discharge has vaporized the vaporizable material in the container. A heat conservator enclosing the lamp device, such as a double walled jacket having the space between the walls evacuated, is usually provided in order to maintain an effective vapor pressure in said container 1 during the operation of the device.

While we have shown and described and have pointed out in the annexed claims certain novel features of the invention, it will be understood that various omissions, substitutions and changes in the forms and details of the device illustrated and in its use and operation may be made by those skilled in the art without departing from the broad spirit and scope of the invention, for example, the container 1 can consist of a non-resistant glass having a coating of resistant glass on the interior thereof.

What we claim as new and desire to secure by Letters Patent of the United States is:—

1. A gaseous electric discharge device comprising a container having an electrode supporting stem, electrodes and electrode leads sealed therein, a gaseous atmosphere in said container, said container comprising a material inert with respect to said gaseous atmosphere, the part of said stem into which said electrode leads are sealed being of a material subject to attack by said gaseous atmosphere and a tubular shield of material inert with respect to the gaseous atmosphere mounted on said stem, said tubular shield being closed at one end and being greater in diameter and in length than the part of said stem subject to attack by said gaseous atmosphere, the end of said shield opposite the closed end thereof being contiguous to and of smaller diameter than the part of said stem inert with respect to said gaseous atmosphere.

2. A gaseous electric discharge device comprising a container having an electrode supporting stem, a gaseous atmosphere therein comprising a metal vapor, an exhaust tube fused to said stem, electrode leads sealed into said stem, electrodes mounted on said leads, said container being of a glass inert with respect to said metal, the part of said stem into which said electrode leads are sealed being of a material subject to attack by said gaseous atmosphere and a tubular shield of material inert with respect to the gaseous atmosphere mounted on said stem, said tubular shield being closed at one end and being greater in diameter and in length than the part of said stem subject to attack by said gaseous atmosphere, the end of said shield opposite the closed end thereof being contiguous to and of smaller diameter than the part of said stem inert with respect to said gaseous atmosphere the joint between said shield and said stem being pervious to gas but impervious to said metal vapor.

3. A stem structure for a gaseous electric discharge device having a sealed container and a gaseous atmosphere therein, said stem comprising a tube of glass subject to attack by the gaseous atmosphere in said device, a tube of a glass inert with respect to the gaseous atmosphere in the device and having a coefficient of expansion different from that of said first mentioned tube, a graded-joint joining said tubes, electrode leads fused into said first mentioned tube, and a tubular shield of material inert with respect to said gaseous atmosphere mounted on said stem, said tubular shield being closed at one end and being greater in diameter and in length than the part of said stem subject to attack by said gaseous atmosphere, the end of said shield opposite the closed end thereof being contiguous to and of smaller diameter than the part of said stem inert with respect to said gaseous atmosphere.

4. A gaseous electric discharge device comprising a container having an electrode supporting stem, a gaseous atmosphere therein comprising a metal vapor, an exhaust tube fused to said stem, and another exhaust tube fused to said container, electrode leads sealed into said stem, electrodes mounted on said leads, said container being of a glass inert with respect to said metal, the part of said stem into which said electrode leads are sealed being of a material subject to attack by said gaseous atmosphere and a tubular shield of material inert with respect to the gaseous atmosphere mounted on said stem, said tubular shield being closed at one end and being greater in diameter and in length than the part of said stem subject to attack by said gaseous atmosphere, the end of said shield opposite the closed end thereof being contiguous to and of smaller diameter than the part of said stem inert with respect to said gaseous atmosphere, the joint between said shield and said stem being pervious to gas but impervious to said metal vapor.

ALFRED RÜTTENAUER.
OTTO FRITZE.